United States Patent [19]
Tashiro

[11] Patent Number: 5,307,168
[45] Date of Patent: Apr. 26, 1994

[54] METHOD AND APPARATUS FOR SYNCHRONIZING TWO CAMERAS

[75] Inventor: Atsushi Tashiro, Washington Township, Burgen County, N.J.

[73] Assignee: Sony Electronics, Inc., Park Ridge, N.J.

[21] Appl. No.: 974,385

[22] Filed: Nov. 10, 1992

Related U.S. Application Data

[63] Continuation of Ser. No. 677,657, Mar. 29, 1991, abandoned.

[51] Int. Cl.5 .......................... H04N 5/30; H04N 5/225
[52] U.S. Cl. .................... 348/64; 358/909.1; 354/410; 354/412; 348/221
[58] Field of Search ............... 358/209, 229, 225, 226, 358/88, 91, 97, 909; 354/76, 410, 412, 110; H04N 5/225, 5/30

[56] References Cited

U.S. PATENT DOCUMENTS

| | | | |
|---|---|---|---|
| 3,128,339 | 4/1964 | Wupper | 358/97 |
| 4,618,239 | 10/1986 | Sakamoto | 354/477 |
| 4,689,696 | 8/1987 | Plummer | 358/333 |
| 4,738,526 | 4/1988 | Larish | 354/412 |
| 4,742,369 | 5/1988 | Ishii et al. | 354/441 |
| 4,805,037 | 2/1989 | Noble et al. | 358/335 |
| 4,841,359 | 6/1989 | Hawkins | 358/76 |
| 4,920,371 | 4/1990 | Kaneko | 354/410 |
| 5,006,871 | 4/1991 | Noble | 354/76 |

OTHER PUBLICATIONS

Nikon N8008S Brochure-1991.
Sony MVC-2000 Brochure-1991.
Nikon F4 Brochure-1989.

*Primary Examiner*—Joseph Mancuso
*Assistant Examiner*—Tuan V. Ho
*Attorney, Agent, or Firm*—William S. Frommer; Alvin Sinderbrand

[57] ABSTRACT

The imaging of a scene by two cameras is synchronized, wherein both cameras include releasable shutters exhibiting different shutter release delays. A controller responds to a release start signal to release the shutter of one of the cameras at a first time and to release the shutter of the other camera at a second, delayed time, the delay being substantially equal to the difference between the shutter release delays of the cameras. The release start signal may be manually produced when the user actuates a start switch; and this start signal is synchronized, or re-timed, when a predetermined one of the cameras is conditioned to image the scene. For example, if that camera includes a rotatable record disk to store electronic image signals, the shutter release operation is synchronized with the rotation of the disk to a reference position.

36 Claims, 4 Drawing Sheets

METHOD AND APPARATUS FOR SYNCHRONIZING TWO CAMERAS

This application is a continuation of application Ser. No. 07/677,657, filed Mar. 29, 1991, now abandoned.

BACKGROUND OF THE INVENTION

1. Field of the Invention

This invention relates to the synchronization of an image taking operation of two cameras and, more particularly, to a method and apparatus which find ready application in a photo-proofing system wherein one camera may be a conventional photographic film camera and the other may be an electronic camera, such as a still video camera.

2. Description of the Prior Art

In professional photography, such as in portraiture, industrial photography or other photographic opportunities having a cooperative or an inanimate subject, several photographic frames or pictures normally are taken, or "shot", developed and selected for use by the photographer or subject. In portraiture applications, it often is inconvenient for the subject to return to the photographer's studio to undertake the selection process. Likewise, it is expensive and labor intensive for the photographer to develop a large number of preselection pictures, or "proofs" and send them to the subject for selection. In some situations, notwithstanding the skill of the photographer, a subsequent portrait-shooting session must be arranged and this adds to the time, labor and expense in concluding the portraiture process.

It has been proposed heretofore to provide a photo-proofing system by which the photographer and his subject may observe a facsimile of the pictures being taken prior to the development thereof, and thereby may select the desired photographs before development and printing even begins. If necessary, additional shots may be taken during the same session if this preliminary review is unsatisfactory. In most if not all of the photo-proofing systems which have been proposed, a video camera of the type normally used to image moving (or active) scenes generates an electronic version of the images being photographed by the conventional film camera. Typically, an optical beam splitter images the subject to both the film camera and the video camera; and a field or frame of the subject which is imaged by the video camera at the time that the shutter of the film camera is triggered is preserved.

In one type of photo-proofing system proposed heretofore, one field of the imaged subject is recorded on a magnetic tape. In another, a complete frame (i.e. two fields) is recorded on magnetic tape. And in yet another, a full field of the imaged subject is recorded in digital form on a hard magnetic disk drive. In addition to being recorded, the particular field or frame also may be displayed on a conventional video monitor, such as a television receiver, for instant "proofing".

In the video cameras used in the photo-proofing systems described above, the electronic image is in the form of a conventional NTSC video signal comprised of successive fields produced by scanning an interlaced array of photoelectric elements on a line-by-line basis. Each field is comprised of alternate lines of the projected image and the fields recur at the rate of sixty fields per second. A complete replica of the original image is formed of a frame comprised of two fields, and the frames recur at the rate of thirty frames per second.

In one embodiment of the aforedescribed photo-proofing system, when the shutter of the photographic film camera is triggered, the particular field being scanned by the video camera at the time of this triggering is "captured." However, since a field essentially contains only half the optical information of the subject being imaged, the capturing of a single field provides generally poor resolution in the electronic "proof". Thus, the photographer and the subject may be able to view only a poor facsimile of the "shot" taken by the film camera and, thus, might not be able to select an acceptable photograph therefrom.

To overcome this difficulty of poor resolution in the captured electronic image, some photo-proofing systems capture a complete frame when the shutter of the film camera is triggered. However, the duration of a frame is 1/30 second which is relatively long and may be significantly longer than the duration that the shutter of the film camera is opened. While this generally may have no affect upon the photographing of portraits wherein the subject generally is stationary, the use of a full frame photo-proofing system with active subjects may result in a change in the pose of the subject at the time that the video frame is captured relative to the time that the shutter of the film camera is actuated.

Another drawback associated with photo-proofing systems is recognized in U.S. Pat. No. 4,805,037 which describes the illumination of a subject to be photographed by an electronic flash unit. As pointed out therein, synchronization of the video camera, the film camera and the flash unit is critical to assure proper flash illumination for the electronic image of the subject. Hence, the cameras and flash unit are synchronized to distribute the flash illumination relatively equally over two fields of video information which are recorded as the facsimile, or proof, of the photographed image.

The typical video camera used in virtually all of the photo-proofing systems proposed heretofore do not include a shutter. A typical shutter mechanism exhibits what is referred to herein as a "shutter release delay" which is essentially an inherent mechanical time delay from the time that the shutter is released until the time that the shutter is fully opened. This shutter release delay generally differs by a relatively small amount from one camera to another of a particular model, but varies greatly from one camera made by one manufacturer to another made by a different manufacturer. For example, the shutter release delay of one camera may be on the order of about 130 milliseconds whereas the shutter release delay of another may be on the order of about 200 milliseconds. Recently, a video still camera has been introduced which includes a shutter similar to shutters used in film cameras. For example, Model MVC-2000PF is a still video camera manufactured by Sony Corporation which includes a shutter to image a scene onto the image pickup therein. The still video camera having a shutter mechanism may be operated by a user in much the same way as a conventional film camera.

When a still video camera having a shutter is used in a photo-proofing system, synchronization of the film and video cameras becomes far more important than previously. This is because an image is not projected continuously onto the image pickup means of the video camera as it was before. Rather, an image is projected only when the shutter of the video camera is released. Therefore, to make certain that the electronic image is a precise facsimile of the latent image projected onto the photographic film requires the opening of the shutters of both cameras at about the same time. Any substantial difference in the actual release of the respective shutters may result in slightly different images being recorded by the respective cameras.

The problem of synchronizing the shutter releases of two cameras is further complicated by the need to synchronize the operation of the video camera shutter with the operation of the storage medium in which the electronic image signals produced by the video camera are recorded. For example, if the storage medium comprises a rotatable magnetic disk, as is used in the aforementioned still video camera manufactured by Sony Corporation, the image projected onto the photosensitive pickup of the camera is not "captured" until the disk rotates to a reference position. This delay in the capturing of the image is, of course, variable and is dependent upon the instantaneous position of the disk at the time that the user attempts to release the shutter. Typically, this variable delay is in the range of about 0-16.7 msec. In any event, this variable delay must be taken into account when synchronizing the release of the shutters of the film and video cameras, which typically exhibit different shutter release delays.

OBJECTS AND SUMMARY OF THE INVENTION

Therefore, it is an object of the present invention to provide improved synchronization of two cameras to concurrently image a scene on their respective imaging media.

Another object of this invention is to provide a synchronizing method and apparatus in which the two cameras are provided with respective shutters exhibiting different shutter release delays.

A further object of this invention is to provide a synchronizing method and apparatus of the aforementioned type in which the recording medium of at least one of the cameras is a storage medium for storing electronic image signals.

An additional object of this invention is to provide a synchronizing method and apparatus of the aforementioned type in which the storage medium comprises a rotatable record disk, and in which the shutters of the camera are controlled such that they release substantially concurrently, even though the cameras exhibit different shutter release delays and even though the operation of at least one of the cameras must be timed with the conditioning of the storage medium to store electronic image signals.

Yet another object of this invention is to provide a synchronizing method and apparatus of the aforementioned type wherein synchronization is maintained for so long as the apparatus is used with the same cameras and resynchronization of the shutter releases need not be "re-learned" for each shot or photographic session.

A still additional object of this invention is to provide a synchronizing method and apparatus of the aforementioned type in which the timing which synchronizes the shutters of the respective cameras is learned during an initial set-up operation and stored for use thereafter.

Another object of this invention is to provide a synchronizing method and apparatus of the aforementioned type in which synchronizing information is updated from time to time to compensate for changing characteristics of the cameras, for example, to compensate for wear on the respective shutter mechanisms, the loss of power in the batteries normally used to operate the cameras, etc.

Various other objects, advantages and features of the present invention will become readily apparent to those of ordinary skill in the art, and the novel features will be particularly pointed out in the appended claims.

In accordance with this invention, a method and apparatus are provided for synchronizing the imaging of a scene by first and second cameras, both of which include shutters and exhibit different shutter release delays when trigger signals are applied to their respective shutter mechanisms. A start signal is generated when it is desired to release the shutters, for example, by operating a manually operable release switch. A controller responds to the start signal to release the shutter of one camera at a first time and to release the shutter of the other camera at a second, delayed time, this delay being substantially equal to the difference between the shutter release delays of the two cameras. The aforementioned first time is a relatively small delay between the time of occurrence of the start signal and a re-timed version of the start signal which is synchronized with the conditioning of at least one of the cameras to image the scene.

In accordance with one aspect of this invention, one camera includes a storage medium for storing electronic image signals, such as a rotatable record disk; and the start signal is re-timed to be synchronized with the movement of that disk to a reference position. The shutter of one camera is released directly in response to the re-timed start signal and the shutter of the other camera is released after a delay equal to the aforementioned difference in shutter release delays.

In accordance with yet another aspect of this invention, the controller preferably comprises a programmable processor, such as a CPU or other microprocessor. As a feature thereof, the controller is operable in a learning mode to determine the shutter release delays of the two cameras, to obtain the difference between these shutter release delays and to establish therefrom the amount by which the faster-operating camera must be delayed to result in the synchronized release of the shutters.

As yet another feature, the respective cameras are provided with PC outputs, each of which produces a pulse when the shutter obtains a predetermined position, for example, when the shutter therein is fully opened. The times of occurrence of the pulses produced by the respective PC outputs are compared for each shutter release operation (or "shot"), and the amount by which the release of the shutter in the faster-operating camera is delayed is adjusted as a function of the difference of these times, averaged over a predetermined number of shots.

BRIEF DESCRIPTION OF THE DRAWINGS

The following detailed description, given by way of example, will best be understood in conjunction with the accompanying drawings in which.

DETAILED DESCRIPTION OF PREFERRED EMBODIMENTS

Figure 1:
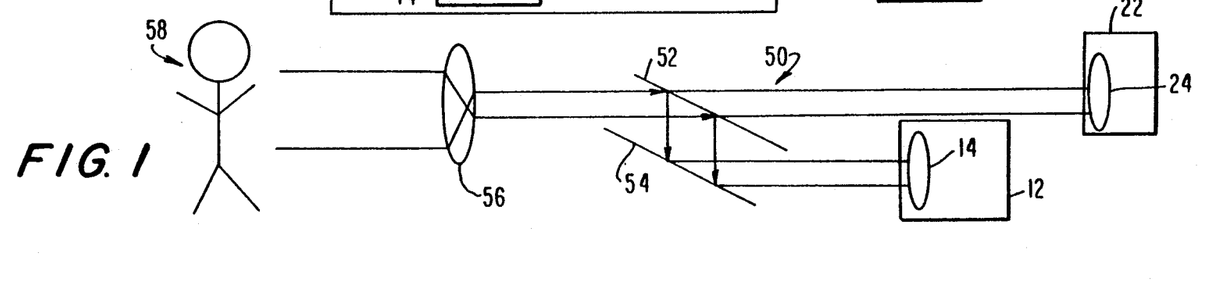
FIG. 1 is a schematic representation of a photo-proofing system in which the present invention finds ready application.

Referring now to the drawings, wherein like reference numerals are used to identify like components, FIG. 1 is a schematic representation of a photo-proofing system by which a subject 58 is imaged concurrently onto recording media included in cameras 12 and 22. In the embodiment described herein, camera 12 comprises a still video camera having a shutter mechanism, such as Model MVC-2000PF manufactured by Sony Corporation of Japan. Camera 22 preferably comprises a film camera which may be of conventional type, such as a 35-mm single lens reflex camera, a medium format camera, or the like. The still video camera is provided with a storage medium on which electronic image signals are stored. In the aforementioned model manufactured by Sony, the storage medium comprises a rotatable magnetic disk on which video signals representing subject 58 are recorded. Film camera 22 is provided with conventional photographic film, such as negative or positive film, to record photographic images in conventional manner.

Cameras 12 and 22 are provided with imaging lenses 14 and 24, respectively. A beam splitter 50 of conventional construction is adapted to split the light image of subject 58 from a single incoming optical path to two separate outgoing optical paths to cameras 12 and 22, respectively. In this regard, beam splitter 50 includes a lens 56 for projecting an image of subject 58 to a mirror 52 which, in turn, passes a portion of the incoming image over a folded optical path including another mirror 54 to camera 12 and passes another portion of the incoming image over a second optical path to camera 22. For example, mirror 52 may comprise a half-silvered mirror or, alternatively, mirrors 52 and 54 may comprise a prism whose optical surfaces are coated in conventional manner to split the incoming beam into two optical paths. For convenience, the optical path to camera 12 is illustrated as a folded optical path. Alternatively, mirror 54 may be omitted and the optical path from mirror 52 to camera 12 may be direct, or unfolded. As a further alternative, the optical paths to both cameras 12 and 22 may be folded.

Although not shown, it is appreciated that a suitable light housing is provided to couple cameras 12 and 22 to beam splitter 50. As one example, both cameras and the beam splitter may be disposed in a common housing. As another example, beam splitter 50 may be disposed in a housing having optical fittings to which cameras 12 and 22 are coupled. It will be appreciated that the optical path from mirror 52 to each of cameras 12 and 22 is substantially equal. Hence, substantially identical images of subject 58 are projected to the cameras with little, if any, parallax.

Figure 2:
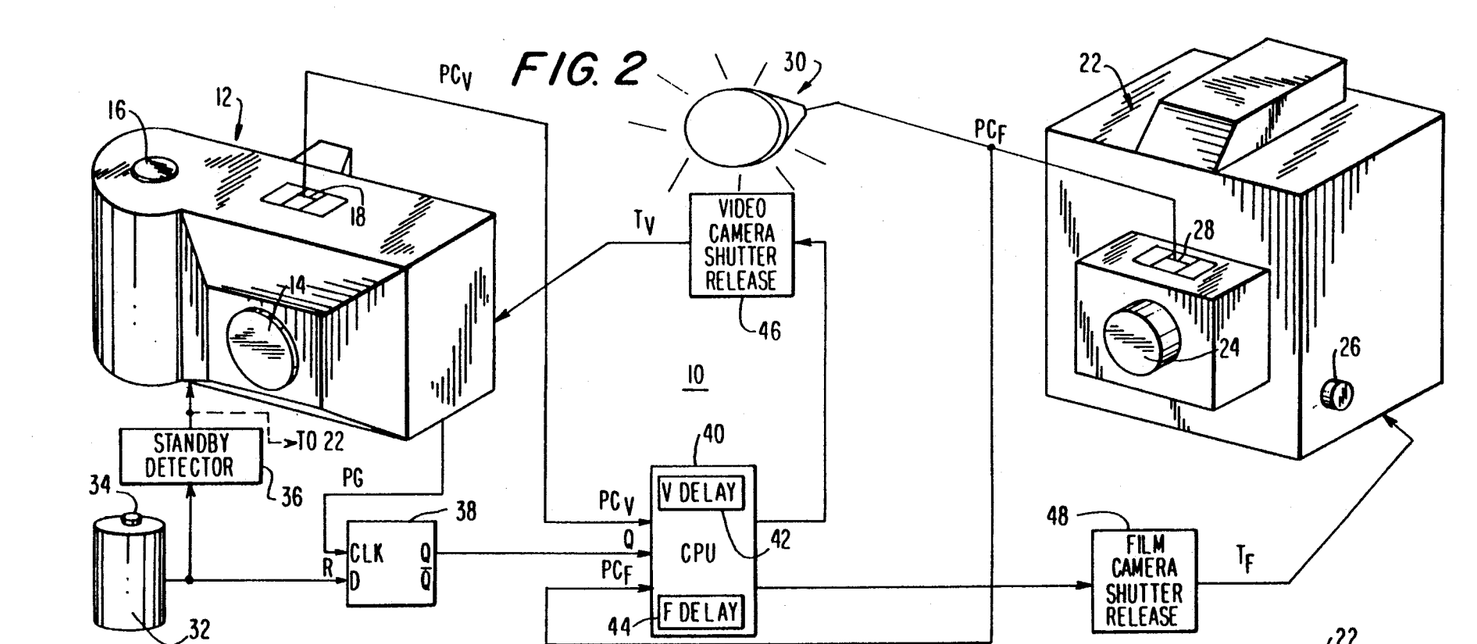
FIG. 2 is a block diagram of one embodiment of the present invention.

Turning now to FIG. 2, there is illustrated a block diagram of one embodiment of a synchronizing system 10 in accordance with the present invention. It will be appreciated that the invention shown in FIG. 2 is intended to be used with beam splitter 50 of FIG. 1 Alternatively, other conventional beam splitting apparatus may be used to project substantially identical images to still video camera 12 and to film camera 22. In the illustrated embodiment, in addition to lens 14, the still video camera is provided with a shutter release button 16 adapted for manual actuation to release the shutter included in the camera and thereby project an image of, for example, subject 58, to the photoelectric pickup element therein. Additionally, a PC output 18 is provided which, as is conventional, produces an output pulse $PC_V$ when the shutter included in still video camera 12 obtains a predetermined position. Typically, pulse $PC_V$ is generated when the shutter is fully opened. If desired, the PC output may be included in an electrical connector, described below.

Although not shown in FIG. 2, it will be appreciated by those familiar with still video camera Model MVC-2000PF that electronic images are recorded on a rotatable record disk, namely, a magnetic disk that is driven at a rotary speed of, for example, 3600 rpm. A suitable electrical connector (not shown) is provided on still video camera 12 to furnish reference pulses PG generated by a pulse generator and position sensor each time the record disk rotates to a reference position. The record disk is conditioned to record video image signals thereon when it reaches this position.

The electrical connector of camera 12 also is adapted to receive control and trigger signals for controlling the operation of still video camera 12 and to trigger the release of the shutter therein. As is known, to record image signals, the rotary record disk must be brought up to operating speed before the shutter is released and the image pickup element therein is exposed to the subject being imaged. This is attained by sensing when shutter release button 16 is partially actuated to a standby position which, in turn, energizes the disk drive motor to bring the record disk up to speed. Alternatively, a standby signal may be supplied to the still video camera via the electrical connector therein to bring the rotary disk up to speed in response to the actuation of a remote selector switch.

A shutter release trigger signal $T_V$, to be described, is coupled to the electrical connector of camera 12 and serves to release the shutter therein.

Further elements included in the still video camera are not described herein; and a more complete understanding of the still video camera may be obtained directly from Model MVC-2000PF.

As aforementioned, film camera 22 is of conventional construction and includes a lens 24, a shutter mechanism and a suitable supply of photographic film upon which a latent image of subject 58 is projected. Camera 22 includes a manually operable shutter release button 26 which, when actuated by the user, releases the shutter therein to expose the film within camera 22 to the subject being imaged. Although not shown, it will be appreciated that camera 22 also is provided with an electrical connector adapted to receive a shutter release trigger signal $T_F$ which, as will be described, performs the same operation as the manual actuation of shutter release button 26, namely, the release of the shutter within the camera. As is typical of conventional cameras, the shutter is electronically controlled and, thus, responds to a shutter release trigger signal that is either generated in response to the actuation of the shutter release button or is supplied remotely to the camera.

Film camera 22 is provided with a PC output 28 similar to PC output 18 of still video camera 12. Accordingly, a PC output pulse $PC_F$ is provided by output 28 when the shutter included in camera 22 obtains a predetermined position, such as its fully opened position. If desired, the PC output may be included in the aforementioned electrical connector of camera 22. As is appreciated by those of ordinary skill in the art, the output pulse $PC_F$ produced by PC output 28 is used to trigger an electronic flash unit; and FIG. 2 schematically illustrates the connection of a flash unit 30 to PC output 28. Hence, when the shutter of camera 22 is fully opened, flash unit 30 is actuated to illuminate the scene being imaged.

Synchronizing system 10 includes a release unit 32, a controller 40 and shutter release trigger circuits 46 and 48. Release unit 32 includes a release button 34 which is manually actuated to generate a start signal when a user intends to release the shutters of cameras 12 and 22 and thereby photograph the subject. In the preferred embodiment, release button 34 produces a standby signal when partially depressed, this standby signal being supplied to still video camera 12 for initiating the rotation of the record disk therein. Optionally, as indicated by broken lines, the standby signal also may be supplied to film camera 22 whereat it may be used to initiate an autofocus and/or autoexposure operation. In this regard, release unit 32 is coupled to a standby detector 36 which detects the partial depression of release button 34 to supply the aforementioned standby signal to the still video camera.

It will be appreciated that release button 34 may be actuated at any time by the user. Hence, the start signal produced by release unit 32 may occur randomly and asynchronously with respect to the rotation of the record disk included in still video camera 12. For a purpose to be described, it is preferable to synchronize the start signal with the rotation of the record disk. Such synchronization is achieved by a synchronizer 38 which, in the preferred embodiment, is included in controller 40. However, in the interest of simplification and to facilitate a ready understanding of the present invention, synchronizer 38 is illustrated separately and, in one embodiment, may be comprised of a timing-controlled flip-flop circuit, such as a conventional D-flip-flop. The synchronizer includes a clock input CLK coupled to still video camera 12 to receive reference pulses PG therefrom, a D input to receive the start signal produced by release unit 32, and a Q output which, in the preferred embodiment, is triggered from a relatively low voltage level to a high voltage level if the start signal is present at the time that a reference pulse PG occurs.

Controller 40 includes an input coupled to the Q output of synchronizer 38. In the preferred embodiment, controller 40 is a programmable processor, such as a central processing unit (CPU) and may be implemented by a conventional microprocessor, such as those commercially available from Intel, Motorola, NEC, Hitachi and other semiconductor manufacturers. The precise construction of the microprocessor forms no part of the present invention per se. Typical operations thereof are described below in conjunction with the flow charts shown in FIGS. 4 and 5.

Controller 40 also is coupled to PC outputs 18 and 28 of cameras 12 and 22 to receive output pulses $PC_V$ and $PC_F$, respectively. The controller preferably includes delay registers 42 and 44 into which are selectively loaded delay control signals, referred to simply as delay data, adapted to impart a delay to one or the other of two shutter release control signals produced by controller 40. These shutter release control signals are adapted to command the release of the shutters in cameras 12 and 22, respectively. Accordingly, these shutter release control signals may be referred to as a video shutter release control signal and a film shutter release control signal. As will be described below in greater detail, one of these shutter release control signals is delayed relative to the other for the purpose of compensating, or equalizing, for different shutter release delays exhibited by cameras 12 and 22.

A shutter release trigger circuit 46 is coupled to controller 40 to receive the video shutter release control signal therefrom and to generate a shutter release trigger signal $T_V$ in response thereto. Shutter release trigger circuit 46 is coupled to the aforementioned electrical connector included in still video camera 12 and functions as a driver to supply the shutter release trigger signal $T_V$ thereto.

Similarly, shutter release trigger circuit 48 is coupled to controller 40 to receive the film shutter release control signal therefrom and to respond to that control signal to supply to camera 22 a shutter release trigger signal $T_F$. This shutter release trigger signal $T_F$ functions to trigger the release of the shutter included in film camera 22, and trigger circuit 48 operates as a driver.

Figure 3A:
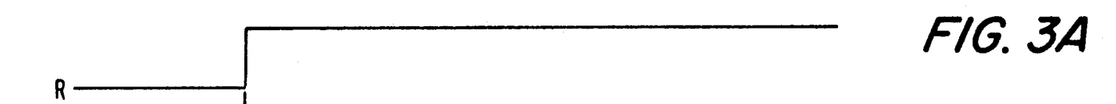
FIGS. 3A-3H are timing diagrams which are useful in understanding the operation of the present invention.
Figure 3B:
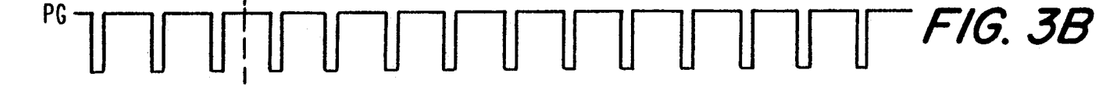

The manner in which synchronizing system 10 operates now will be described in conjunction with the timing diagram waveforms shown in FIGS. 3A–3H. Let it be assumed that standby detector 36 has detected the partial depression of release button 34 to dispose still video camera 12 in its standby mode. Hence, it is assumed that the record disk in the still video camera has been brought up to proper operating speed. Let it now be assumed that release button 34 is actuated to generate the start signal R shown in FIG. 3A at time $t_1$. FIG. 3B illustrates the reference pulses PG generated by the still video camera as the record disk rotates past its reference position. A comparison of FIGS. 3A and 3B illustrates that the start signal R occurs at an arbitrary time between successive occurrences of reference pulses PG.

Figure 3C:
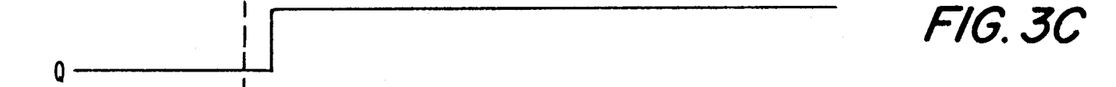
Figure 3D:
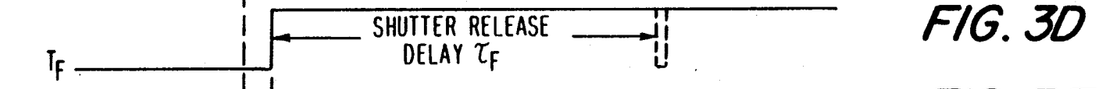

Synchronizer 38 synchronizes the start signal R to produce a re-timed start signal Q, shown in FIG. 3C, which is synchronized to occur at a time $t_2$ when a reference pulse PG is generated.

Controller 40 responds to the synchronized start signal Q to produce a shutter release control signal which, in turn, results in a shutter release trigger signal T. Let it be assumed that the shutter release delay of still video camera 12 is equal to $\tau_V$ and that the shutter release delay of film camera 22 is equal to $\tau_F$. As used herein, the shutter release delay $\tau$ is equal to the delay from the time that a shutter release trigger signal T is supplied to the camera to the time that the shutter therein is fully opened to produce an output pulse PC from the PC output of the camera. As discussed above, this shutter release delay varies from camera to camera; and in the example described herein, it is assumed that the shutter release delay $\tau_V$ of still video camera 12 is less than the shutter release delay $\tau_F$ of film camera 22. That is, the still video camera exhibits a faster response time to a shutter release trigger signal than does the film camera.

As will be described below, controller 40 is operable in a learning mode to learn, or measure, the duration of shutter release delay $\tau_F$ exhibited by film camera 22, to measure the duration of shutter release delay $\tau_V$ exhibited by still video camera 12 and to obtain the difference $\Delta T$ therebetween. If, for example, the shutter release delay of film camera 22 is greater than the shutter release delay of still video camera 12, the difference $\Delta T$ ($\Delta T = \tau_F - \tau_V$) is stored in delay register 42 to delay the production by controller 40 of the video shutter release control signal. Alternatively, if the shutter release delay exhibited by the still video camera is greater than the shutter release delay exhibited by the film camera ($\tau_V > \tau_F$), the difference therebetween $\Delta T$ is stored in delay register 44 to delay the production by controller 40 of the film shutter release control signal. From FIGS. 3D and 3E, it is assumed that $\tau_F > \tau_V$ and the difference $\Delta T$ between the respective shutter release delays is loaded into delay register 42. This difference $\Delta T$ is referred to simply as a time delay.

Accordingly, controller 40 responds to the synchronized, or re-timed start signal Q to produce directly therefrom, that is, substantially without delay, the film shutter release control signal. This control signal is applied to shutter release trigger circuit 48 which generates the shutter release trigger signal $T_F$ shown in FIG. 3D. It is seen that this shutter release trigger signal is generated at time $t_2$ and is supplied to film camera 22 to actuate, or release the shutter therein. Hence, the shutter in the film camera is released at time $t_2$ and, because of its inherent shutter release delay $\tau_F$, is fully opened at a later time $t_4$ delayed from the shutter release time by the aforementioned shutter release delay $\tau_F$.

Controller 40 delays production of the video shutter release control signal by the time delay amount $\Delta T$ ($\Delta T = \tau_F - \tau_V$). Accordingly, at a later time $t_3$, the controller produces the video shutter release control signal in response to the retimed start signal Q. This video shutter release control signal is applied to shutter release trigger circuit 46 which generates the shutter release trigger signal $T_V$ at time $t_3$ shown in FIG. 3E. It is seen, therefore, that the shutter release trigger signals $T_F$ and $T_V$ are generated at times $t_2$ and $t_3$, respectively, these times being delayed from each other by the time delay $\Delta T$ which is equal to the difference between the respective shutter release delays ($\Delta T = \tau_F - \tau_V$).

The shutter release trigger signal $T_V$ is coupled to still video camera 12 to trigger the release of the shutter therein. As a result of the inherent shutter release delay $\tau_V$ exhibited by the still video camera, the shutter reaches its fully opened position at the later time $t_4$. It is appreciated, from FIGS. 3D and 3E, that, because of the time delay $\Delta T$ imparted to the video shutter release control signal relative to production of the film shutter release control signal, even though still video camera 12 exhibits a faster response time than film camera 22, the shutters of both reach their respective fully opened positions at substantially the same time $t_4$. Thus, the shutters of both cameras are synchronized to be fully opened at substantially the same time in response to user actuation of release unit 32, even though these cameras exhibit different shutter release delays and, moreover, even though the shutter of the still video camera is inhibited from being released until the rotary record disk therein rotates to a reference position. Consequently, both cameras record substantially identical images of the subject being photographed.

Figures 3E, 3F:
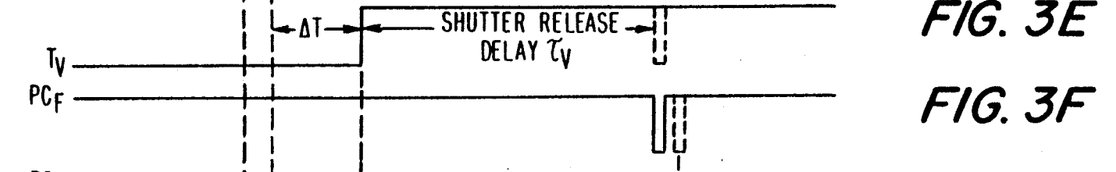
Figure 3G:
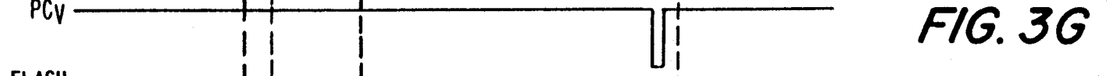
Figure 3H:
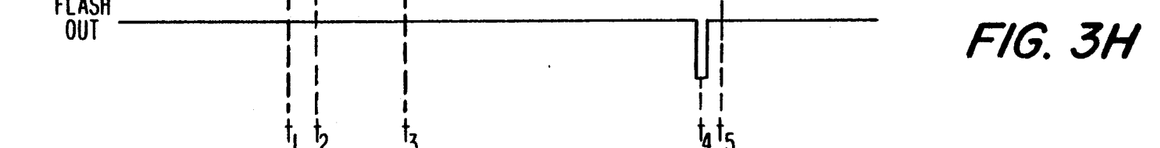

FIGS. 3F and 3G illustrate that output pulses $PC_F$ and $PC_V$ are produced at substantially the same time $t_4$. As mentioned above, these output pulses are produced by PC outputs 28 and 18, respectively, at the times that the shutters in cameras 22 and 12 reach their fully opened positions. Usually, this PC output pulse is applied to a flash unit to trigger that unit for flash illumination of the subject being photographed. In FIG. 2, the output pulse $PC_F$ produced by PC output 28 of film camera 22 is applied to flash unit 30 to trigger the flash unit at time $t_4$, as illustrated in FIG. 3H.

It is expected that, during normal operation of still video camera 12 and film camera 22 the shutter mechanism in one or both of these cameras will be subject to wear such that the shutter release delays exhibited by these cameras may vary over time. Likewise, since both cameras preferably incorporate electronic shutter mechanisms, as the energy level of the respective batteries used to supply energy to the electronic circuitry included in each camera decreases, the shutter release delay exhibited by the camera may increase. Still further, normal changes in the response time of the electronic circuitry used in each camera likewise may result in a change in the shutter release delay exhibited by that camera. In accordance with a desirable feature of the present invention, changes in the shutter release delay of one or both cameras, and particularly changes in the difference $\Delta T$ between these shutter release delays are detected and such changes are compensated, whereby the shutters of both cameras nevertheless remain synchronized.

As will be described below, the time delay $\Delta T$ which is loaded into delay register 42 (in the event that camera 12 exhibits a faster response time than camera 22) or into delay register 44 (in the event that camera 22 exhibits a faster response time than camera 12) is adjusted if there is a change in the shutter release delay exhibited by one or both cameras. Broadly, this compensation is produced as a function of the difference, in any, of the times of occurrence of output pulses $PC_F$ and $PC_V$. For example, let it be assumed that the inherent shutter release delay $\tau_F$ exhibited by film camera 22 increases relative to the shutter release delay $\tau_V$ exhibited by still video camera 12. As a result, since camera 22 nevertheless is supplied with shutter release trigger signal $T_F$ at time $t_2$, output pulse $PC_F$ is generated at time $t_5$, as shown by the pulse illustrated in broken lines in FIG. 3F. Assuming that the shutter release delay $\tau_V$ exhibited by still video camera 12 has not changed significantly, the output pulse $PC_V$ provided by PC output 18 is generated at time $t_4$. It is appreciated, then, that the difference $\Delta T$ between the shutter release delays of cameras 22 and 12 changes by an amount equal to $t_5 - t_4$. To compensate for this change in the shutter release delay of film camera 22, the time delay $\Delta T$ which had been loaded into delay register 42 is increased by the quantity ($t_5 - t_4$). Hence, the time delay now imparted to the video shutter release control signal relative to the film shutter release control signal may be expressed as: $\Delta T + (t_5 - t_4)$. Alternatively, if the shutter release delay $\tau_V$ exhibited by still video camera 12 increases relative to the shutter release delay $\tau_F$ exhibited by film camera 22, the time delay $\Delta T$ stored in delay register 42 and imparted to the video shutter release control signal is reduced by the amount ($t_5 - t_4$), where $t_5$ now is the time of occurrence of output pulse $PC_V$ and $t_4$ is the time of occurrence of output pulse $PC_F$.

In the preferred embodiment, the time delay $\Delta T$ loaded into delay register 42 is adjusted by an average of the time difference $t_5 - t_4$ taken over a predetermined number of "shots", for example, an average taken over eight shots. The time delay $\Delta T$ loaded into register 42 thus may be adjusted as a function of a rolling average of the time difference $t_5 - t_4$.

The foregoing description has assumed that still video camera 12 exhibits a faster response time, that is, a shorter shutter release delay than film camera 22. If, in fact, the film camera exhibits a faster response time, then controller 40 generates the video shutter release control signal directly in response to the re-timed start signal Q at time $t_2$ and the film shutter release control signal is delayed by the time delay $\Delta T$, wherein $\Delta T = \tau_V - \tau_F$. This time delay $\Delta T$ now is loaded into delay register 44 to delay the production by controller 40 of the film shutter release control signal, which now is generated at time $t_3$. Furthermore, if the difference in the shutter release delays $\tau_V - \tau_F$ varies over time, the amount of this time delay $\Delta T$ stored in delay register 44 is adjusted to compensate for this change. That is, this time delay $\Delta T$ is increased if the difference between the shutter release delays increases and is reduced if the difference between the shutter release delays decreases.

In the preferred embodiment, controller 40 is comprised of a programmed processor and synchronizer 38 is included in the programmed processor. The manner in which the programmed processor operates now will be described in conjunction with the flow charts shown in FIGS. 4 and 5.

Figure 4:
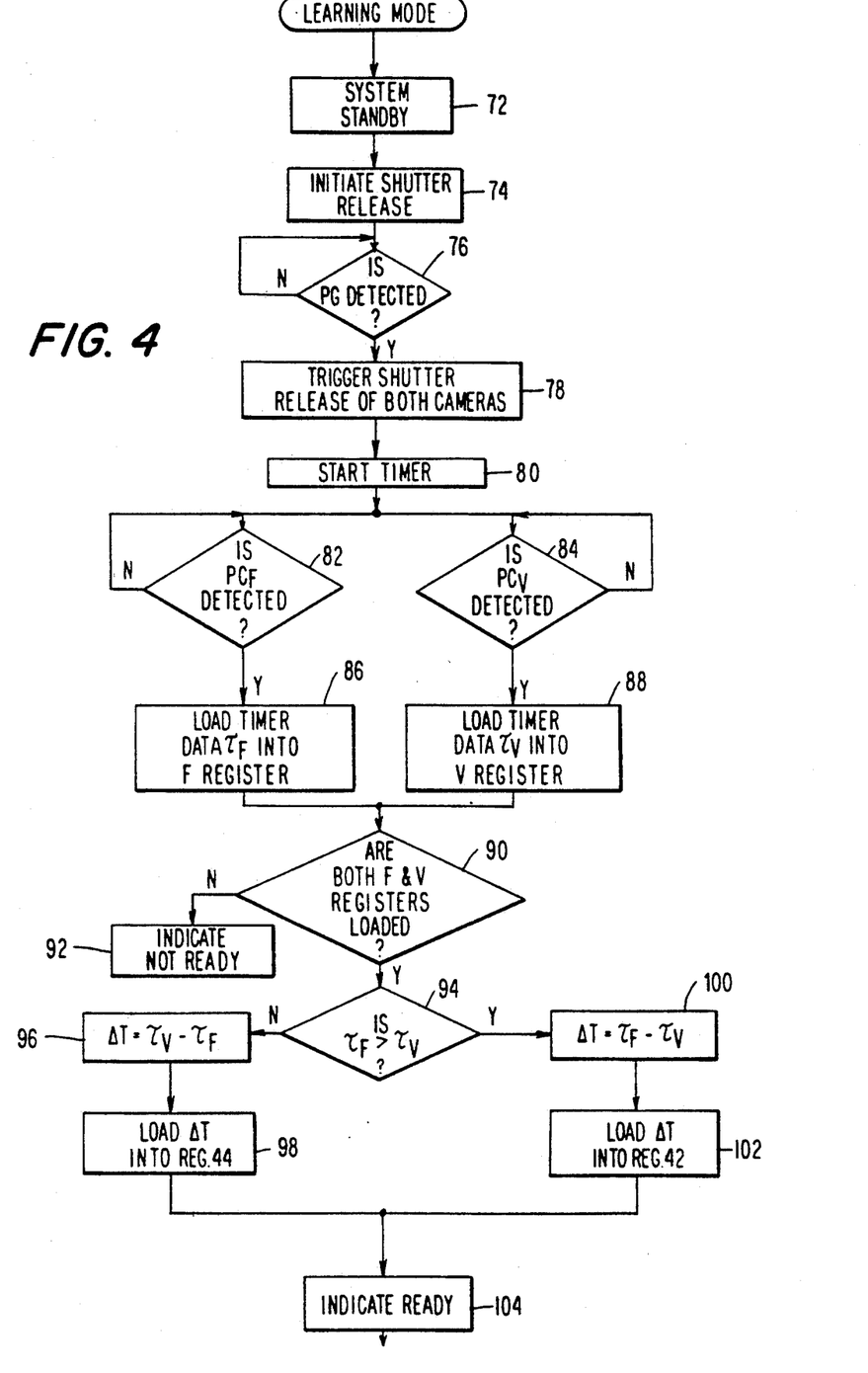
FIG. 4 is a flow chart representing the manner in which the programmable controller of the present invention operates in a learning mode.

As stated previously, the controller, now referred to as a processor, is operable in a learning mode to obtain the time delay $\Delta T$ by which one of the shutter release control signals is delayed. FIG. 4 is a flow chart illustrating the operation of the processor in this learning mode routine.

The learning mode routine may be initiated in response to the operation of a suitable selector switch (not shown). Upon entering this routine, the processor advances to instruction 72 which places synchronizing system 10 in its standby condition. Accordingly, the disk drive motor included in still video camera 12 is energized and the recording disk is brought up to proper rotary speed. Upon attaining this standby condition, the processor advances to instruction 74 which initiates the shutter release in both cameras 12 and 22 by simulating start signal R (FIG. 3A).

Then, the processor inquires, at 76, if a reference pulse PG has been produced by the disk drive included in still video camera 12. If not, the processor simply cycles through this inquiry until a reference pulse PG is detected. At that time, the processor generates the video and film shutter release control signals substantially simultaneously as indicated by instruction 78. These signals are applied to shutter release trigger circuits 46 and 48, respectively, to release the shutters in both cameras. At the same time, a timer included in the processor is started, as indicated by instruction 80.

Then, inquiries 82 and 84 are made to detect when an output pulse $PC_F$ is received from PC output 28 of camera 22 and to detect when an output pulse $PC_V$ is received from PC output 18 of camera 12. As illustrated, the processor cycles through inquiries 82 and 84 until an output pulse is received from the still video camera and from the film camera, respectively. When film camera 22 generates this output pulse, inquiry 82 is answered in the affirmative and the time data then attained by the timer is loaded into a register as shutter release delay $\tau_F$, as represented by instruction 86. For convenience, this register is referred to herein simply as the F register, indicating that it stores the shutter release delay exhibited by film camera 22.

Likewise, when output pulse $PC_V$ is received from PC output 18 of still video camera 12, inquiry 84 is answered in the affirmative and the time data reached by the timer when this output pulse is generated is loaded into a register as shutter release delay $\tau_V$, as represented by instruction 88. This register is referred to as the V register and stores the shutter release delay $\tau_V$ exhibited by camera 12.

After a suitable delay (not shown) sufficient to determine and store shutter release delays $\tau_F$ and $\tau_V$, the processor advances to inquire, at 90, if the F and V registers both are loaded with timer data. If not, instruction 92 is executed and a "not ready" indication is provided. For example, a suitable visual indicator, such as an LED, is energized to indicate that the synchronizing system is not ready for operation. However, if the F and V registers both are loaded with time data $\tau_F$ and $\tau_V$, inquiry 90 is answered in the affirmative and the processor advances to inquiry 94. Here, the shutter release delays $\tau_F$ and $\tau_V$ in the F and V registers are compared. If $\tau_F$ is greater than $\tau_V$, inquiry 94 is answered in the affirmative and the difference therebetween $\Delta T$ is calculated by instruction 100. This difference is loaded into delay register 42, as represented by instruction 102, which means that, since the still video camera exhibits a faster response time than the film camera, the shutter release trigger signal $T_V$ should be delayed to assure that the shutter of the still video camera is fully opened at the same time that the shutter of the film camera is fully opened.

Alternatively, if $\tau_F$ is less than $\tau_V$, inquiry 94 is answered in the negative and the processor advances to instruction 96 to calculate the difference $\Delta T$ between the shutter release delay $\tau_V$ and the shutter release delay $\tau_F$ stored in the V and F registers, respectively. Then, this difference $\Delta T$ is loaded into delay register 44, as indicated by instruction 98, thereby delaying the generation of the shutter release trigger signal $T_F$ to compensate for the faster response time of the film camera relative to the response time of the still video camera. This assures that the shutters of both cameras will be fully opened at the same time.

After the difference $\Delta T$ between the shutter release delays is stored in register 42 or in register 44, as the case may be, the processor advances to instruction 104 to provide a system ready indication. For example, a suitable visual indicator, such as an LED, is energized to indicate to the user that the synchronizing system now is ready to carry out a "shooting" operation.

The foregoing has explained the learning mode of controller 40 and the manner in which the shutter release delays of the respective cameras are calculated, the difference therebetween is obtained and this difference is stored to delay the release of the shutter of the camera exhibiting a faster response time. From FIGS. 3D-3G, it is seen that this delay assures that both shutters reach their fully opened positions at substantially the same time, which means that the images obtained from both cameras are substantially identical. Thus, in the event that the photographic subject is a moving subject, the shutters of both cameras are fully opened at substantially the same time to record substantially the same configuration, or position of that subject.

The manner in which controller 40 carries out a "shooting" operation now will be described in conjunction with the routine represented by the flow chart illustrated in FIG. 5. As before, it is assumed that synchronizer 38 is included in controller 40 and that the controller is implemented as a programmable processor. The shooting mode routine represented in FIG. 5 may be selected by, for example, user operation of a manual switch. Once the processor enters the shooting mode routine, instruction 110 is executed and the synchronizing system is disposed in its standby condition. Thus, the disk drive which rotates the recording disk is brought to its predetermined operating speed.

When in the standby mode, user actuation of release unit 32, as by fully depressing release button 34, initiates the shutter release, as represented by instruction 112 to supply start signal R, shown in FIG. 3A, to the processor. The processor then advances to inquire, at 114, if a reference pulse PG has been detected. If not, the processor simply cycles through this inquiry until receipt of reference pulse PG from the disk drive unit included in still video camera 12.

In response to the reference pulse PG, the processor advances to instruction 116 to generate a shutter release control signal directly, that is, without significant delay. For the purpose of the present discussion, it is assumed that still video camera 12 exhibits a faster response time than film camera 22. Hence, consistent with FIGS. 3D and 3E, it is assumed that the shutter release delay $\tau_F$ of the film camera is greater than the shutter release delay $\tau_V$ of the still video camera. Accordingly, instruction 116 serves to generate the film shutter release control signal directly.

Figure 5:
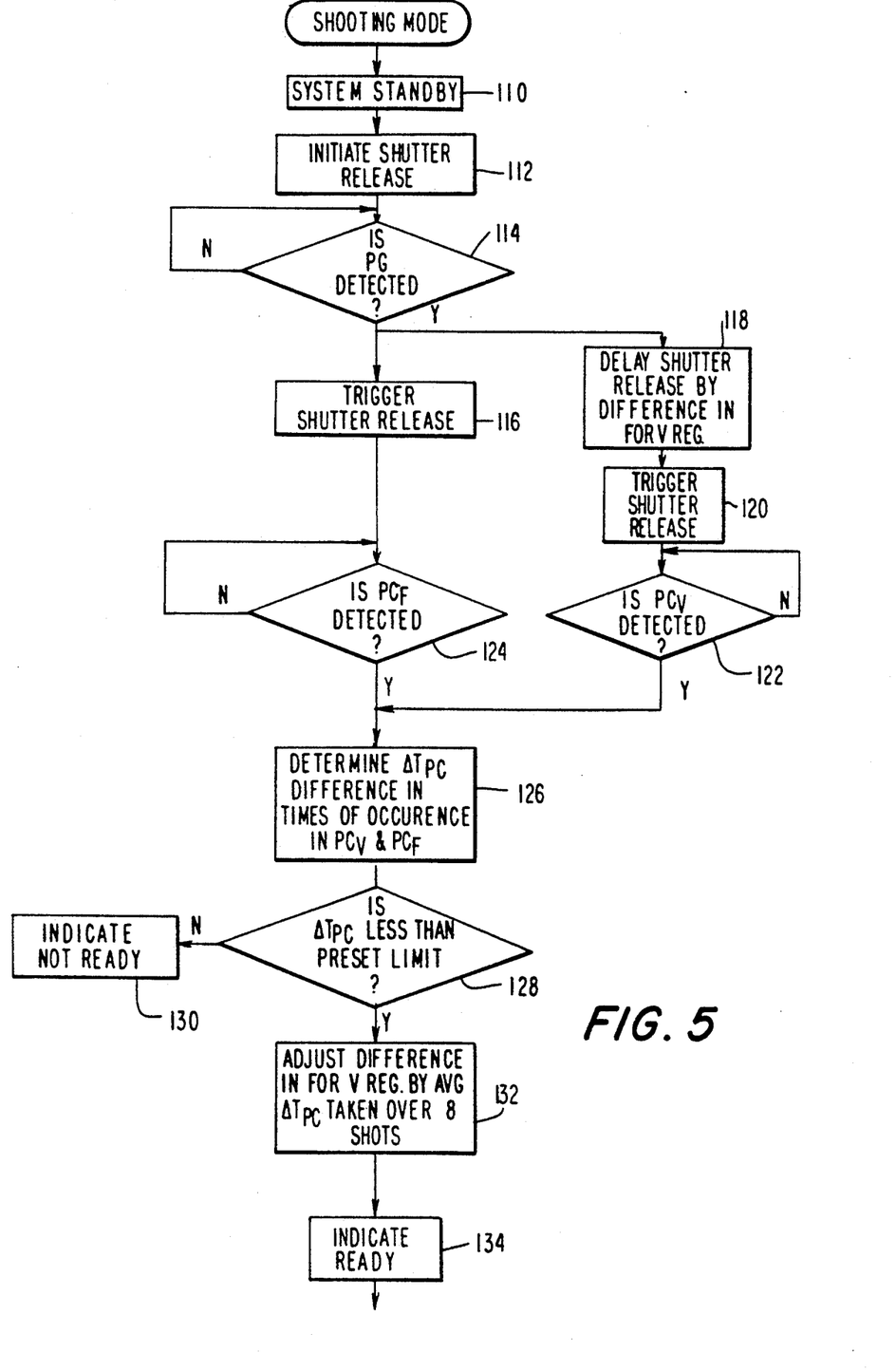
FIG. 5 is a flow chart illustrating the manner in which the programmable controller of the present invention operates in a shooting mode.

The processor also advances to instruction 118, as shown in FIG. 5, to delay the generation of the video shutter release control signal by the time delay $\Delta T$ which had been loaded into delay register 42 during the learning mode (instruction 102). At the completion of this time delay $\Delta T$, the processor advances to instruction 120 to generate the video shutter release control signal.

The shutter release control signals generated by the processor are supplied to shutter release trigger circuits 46 and 48 which apply shutter release trigger signals $T_V$ and $T_F$ to cameras 12 and 22, respectively. At this time, the processor inquires, at 122 and 124, if the output pulse PC produced by each of the cameras is received therefrom. If not, the processor simply cycles through the respective inquiries until output pulses $PC_V$ and $PC_F$ are detected. Although not shown in FIG. 5, a timer is accessed when output pulse $PC_V$ is detected and also when output pulse $PC_F$ is detected. This timer is examined at instruction 126 to determine the time difference $\Delta T_{PC}$ in the times of occurrence of these output pulses $PC_V$ and $PC_F$. From FIGS. 3F and 3G, if it is assumed that output pulse $PC_F$ occurs at time $t_5$ and output pulse $PC_V$ occurs at time $t_4$, the time difference ($\Delta T_{PC} = t_5 - t_4$) is obtained. Then, the processor advances to inquiry 128 to determine if this time difference $\Delta T_{PC}$ is less than a preset limit. This inquiry is answered in the negative if the shutter of one camera reaches its fully opened position at a time much later than that of the other camera, and a suitable visual indication is provided, as represented by instruction 130, that the synchronizing system is not ready to operate satisfactorily. For example, if $\Delta T_{PC}$ is greater than 2 msec, a "not ready" indication is provided.

However, if $\Delta T_{PC}$ is less than the preset limit (for example, if $\Delta T_{PC} < 2$ msec), inquiry 128 is answered in the affirmative, which means that the shutters of both cameras open at or about substantially the same time. This tolerance in the times of occurrence of output pulses $PC_V$ and $PC_F$ is permissible and, as a practical matter, the images recorded by both cameras will be substantially the same if the shutters of both cameras reach their respective fully opened positions within this preset time "window".

As mentioned above, it is expected that, over time, the shutter release delays exhibited by the respective cameras will vary from the learned values $\tau_F$ and $\tau_V$. This variance may be due to a reduction in the power supplied by the respective batteries to cameras 12 and 24, to wear on the mechanical elements included in the respective shutter mechanisms, to changes in the operating characteristics of the electronic circuitry included in both cameras, and the like. It is, therefore, an advantageous feature of the present invention to compensate for changes in one or both shutter release delays. Instruction 132 is carried out by the processor to adjust the delay time $\Delta T$ that is stored in delay register 42 or in delay register 44, as the case may be, if the time difference $\Delta T_{PC}$ changes. In particular, and as represented by instruction 132, the average time difference $\Delta T_{PC}$ taken over eight cycles through the shooting mode routine illustrated in FIG. 5 is obtained. That is, the determined time difference $\Delta T_{PC}$ taken over eight "shots" is averaged. This averaged time difference $\Delta T_{PC}$ is used to increase or decrease the delay time $\Delta T$ that is stored in register 42 or in register 44. Hence, if the averaged time difference $\Delta T_{PC}$ decreases, the time delay $\Delta T$ is reduced. Conversely, if the averaged time difference $\Delta T_{PC}$ increases, the stored time delay $\Delta T$ likewise is increased.

After executing instruction 132, the processor advances to instruction 134 to provide an indication to the user that the synchronizing system now is ready to carry out another shooting operation. For example, a suitable visual indicator, such as an LED "ready" indicator, is energized.

In the forgoing description of the flow chart shown in FIG. 5, it has been assumed that still video camera 12 exhibits a faster response time than film camera 22. Consistent with this assumption, the time delay $\Delta T$ between the shutter release delays had been stored in delay register 42 so as to delay the shutter release trigger signal $T_V$ supplied to the still video camera. Likewise, and consistent with this assumption, the time delay $\Delta T$ is adjusted by the averaged time difference $\Delta T_{PC}$ in the times of occurrence of output pulses $PC_F$ and $PC_V$. If, however, the film camera exhibits a faster response time than the video camera, then the time delay $\Delta T$ which is determined by the learning mode routine shown in FIG. 4 is loaded into and stored in delay register 44 to delay the generation of the shutter release trigger signal $T_F$ supplied to film camera 22. Consistent with this alternative assumption, the time delay $\Delta T$ stored in delay register 44 is adjusted by the averaged time difference $\Delta T_{PC}$ to compensate for changes in the shutter release delays of the respective cameras.

While the present invention has been particularly shown and described in conjunction with a preferred embodiment thereof, it will be readily appreciated by those of ordinary skill in the art that various changes may be made without departing from the spirit and scope of the invention. For example, the storage medium included in still video camera 12 on which electronic image signals are stored has been assumed to be a rotatable magnetic disk. Other suitable storage media may be used, such as magnetic tape, an erasable optical disk, a write-once-read-many times (WORM) disk, or a solid-state storage medium, such as a frame memory or other suitable RAM. In any event, reference pulses similar to aforedescribed reference pulses PG may be generated to indicate when the storage medium is conditioned to stored the electronic image signals therein. These reference pulses thus may represent the positioning of a movable storage medium to a reference position or they may represent an "enable" condition of a semiconductor storage medium. In any event, the present invention is applicable to such other storage media.

As another alternative, although shutter release trigger circuits 46 and 48 have been shown as separate circuits, such as shutter drivers, it is appreciated that these circuits may be incorporated into the processor which comprises controller 40. Likewise, standby detector 36 also may be incorporated into the processor.

Still further, although FIG. 2 illustrates the use of a flash unit with synchronizing system 10, it will be recognized that such flash unit is optional and may be omitted, if desired. The presence or absence of the flash unit has no significant affect upon the operation of the synchronizing system described herein.

Therefore, it is intended that the appended claims be interpreted as including the embodiments described herein, the alternatives mentioned above, and all equivalents thereto.

What is claimed is:

1. Apparatus for synchronizing the imaging of a scene by first and second cameras having respective shutters wherein said shutters may exhibit different shutter release delays $\tau_1$ and $\tau_2$, respectively, from the time that trigger signals are supplied to the respective cameras until the shutters arrive at their respective fully open positions, said apparatus comprising:
   release means operable to initiate triggering of the shutters in said first and second cameras;
   drive signal generating means for initiating a drive signal at a time $t_a$ synchronized with the arrival of a storage medium of at least one of the cameras at a reference position for recording an image of the scene on said storage medium;
   first and second trigger means synchronized in accordance with said drive signal for producing first and second trigger signals to release the shutters of said first and second cameras, respectively, such that the shutters arrive at their fully open positions at times $t_x$ and $t_y$ following said first and second trigger signals, respectively; and
   delay means for delaying one of said trigger signals with respect to the other by a delay amount $\Delta T$ substantially equal to the difference in the shutter release delays of said cameras $\Delta T = \tau_1 - \tau_2$ so that the shutters of said first and second cameras arrive at their fully open positions at substantially the same time t, where $t = t_a + \tau_1 = t_a + \Delta T + \tau_2$.

2. The apparatus of claim 1 wherein said storage medium of said one camera includes a rotary record disk to store electronic image signals.

3. The apparatus of claim 2, wherein said record disk has said reference position, and further comprising reference pulse means for providing a reference pulse when said disk rotates to said reference position and thereby is conditioned to store electronic image signals thereon.

4. The apparatus of claim 3 wherein said release means comprises switch means for generating a start signal.

5. The apparatus of claim 4 wherein said switch means is manually operable.

6. Apparatus for synchronizing the imaging of a scene by first and second cameras having respective shutters wherein said cameras may exhibit different shutter release delays when trigger signals are supplied thereto, and one camera includes a rotary record disk to store electronic image signals and said record disk has a reference position, said apparatus comprising:
   reference pulse means for providing a reference pulse when said disk rotates to said reference position and thereby is conditioned to store electronic image signals thereon;
   release switch means for generating a start signal operable to initiate triggering of the shutters in said first and second cameras;
   drive signal generating means including retiming means for synchronizing said start signal generated by said switch means with said reference pulse provided by said reference pulse means to produce a drive signal;
   first and second trigger means responsive to said drive signal for producing first and second trigger signals to release the shutters of said first and second cameras, respectively; and
   delay means for delaying one of said trigger signals with respect to the other by a delay amount substantially equal to the difference in the shutter release delays of said cameras.

7. Apparatus for synchronizing the imaging of a scene by first and second cameras having respective shutters wherein said cameras may exhibit different shutter release delays when trigger signals are supplied thereto, said apparatus comprising:
   release means operable to initiate triggering of the shutters in said first and second cameras;
   drive signal generating means responsive to the operation of said release means for generating a drive signal synchronized to the conditioning of at least one of the cameras to record an image of the scene;
   first and second trigger means responsive to said drive signal for producing first and second trigger signals to release the shutters of said first and second cameras, respectively; and
   control means coupled to said drive signal generating means and including delay means for delaying one of said trigger signals with respect to the other by a delay amount substantially equal to the difference in the shutter release delays of said cameras, said control means responding to said drive signal for activating one of said trigger means directly to apply a trigger signal to one camera and for activating the other of said trigger means after a delay equal to said delay amount to apply a trigger signal to the other camera.

8. The apparatus of claim 7 wherein said control means includes learning means operable in a learning mode for determining the shutter release delay of said first camera and the shutter release delay of said second camera, and difference means for obtaining the difference between the respective shutter release delays to establish said delay amount.

9. The apparatus of claim 8 wherein each of said first and second cameras includes a PC output for producing a pulse when the shutter therein obtains a predetermined position; and wherein said learning means includes first shutter release determining means for determining a first time delay between a first trigger signal that releases the shutter of said first camera and the pulse produced by the PC output of said first camera, and second shutter release determining means for determining a second time delay between a second trigger signal that releases the shutter of said second camera and the pulse produced by the PC output of said second camera.

10. The apparatus of claim 9 wherein said delay means includes first and second delay registers for selectively delaying the activation of said first or second trigger means, respectively, by said delay amount; and wherein said control means includes means for loading said delay amount into said first delay register to delay said first trigger signal when the determined second time delay exceeds the determined first time delay and means for loading said delay amount into said second delay register to delay said second trigger signal when the determined first time delay exceeds the determined second time delay.

11. The apparatus of claim 7 wherein each of said cameras includes a PC output for producing a pulse when the shutter therein obtains a predetermined position; and wherein said control means includes programmable means operable in a learning mode to activate said first and second trigger means concurrently, to determine a first shutter release delay substantially equal to a time delay between the activation of said first trigger means and the pulse produced by the PC output of said first camera, to determine a second shutter release delay substantially equal to a time delay between the activation of said second trigger means and the pulse produced by the PC output of said second camera, to determine said delay amount by obtaining a difference between said first and second shutter release delays, and to delay by said delay amount the trigger signal to be applied to the camera having the smaller shutter release delay.

12. The apparatus of claim 11 wherein said programmable means is operable in a shooting mode to respond to said drive signal to activate the one trigger means which applies a trigger signal to the camera having the larger shutter release delay, to activate the other trigger means after a delay equal to said delay amount, to determine a time difference in the times of occurrence of the pulses produced by the PC outputs of said first and second cameras, and to adjust said delay amount as a function of an average of a predetermined number of said time differences.

13. The apparatus of claim 12 wherein said programmable means is further operable in said shooting mode to sense if said time difference exceeds a preset amount and, if so, to produce an indication thereof.

14. Photo-proofing apparatus comprising:
a film camera having a releasable shutter for imaging a scene to be photographed onto a film medium and exhibiting a first shutter release delay from the time that the shutter therein is released until the time that said shutter is opened;
a still video camera having a releasable shutter for imaging said scene onto a record medium and exhibiting a second shutter release delay from the time that the shutter therein is released until the time that said shutter is opened, said record medium being movable past a reference position;
beam splitting means for projecting substantially identical images of said scene to be photographed to said film camera and to said video camera;
start means for generating a start signal; and
control means responsive to the start signal to release the shutter of one of said cameras at a first time and to release the shutter of the other camera at a second, delayed time, the delay being substantially equal to a difference between said first and second shutter release delays.

15. The apparatus of claim 14 wherein said start means includes trigger means for generating said start signal, and synchronizing means for synchronizing the start signal with the movement of said record medium to said reference position.

16. The apparatus of claim 15 wherein said video camera includes pulse generating means for generating a reference pulse each time said record medium moves to said reference position.

17. The apparatus of claim 16 wherein said synchronizing means comprises timing means for timing said start signal to occur when a reference pulse is generated, thereby producing a synchronized start signal delayed from the start signal generated by said trigger means.

18. The apparatus of claim 17 wherein said control means is operable to apply the synchronized start signal to said one camera as a shutter release signal to release the shutter therein.

19. The apparatus of claim 18 wherein said control means includes delay means responsive to said synchronized start signal to supply to said other camera a delayed shutter release signal to release the shutter therein.

20. The apparatus of claim 19 wherein each of said cameras includes a PC output for providing a respective shutter-open pulse when the shutter therein is opened; and said control means includes delay adjust means for adjusting the delay of said delay means as a function of a time difference in the shutter-open pulses provided by the respective PC outputs.

21. The apparatus of claim 20 wherein the delay of said delayed shutter release signal applied to said other camera is reduced if the shutter-open pulse provided by the PC output of said other camera lags the shutter-open pulse provided by the PC output of said one camera, and the delay is increased if the shutter-open pulse provided by the PC output of said other camera leads the shutter-open pulse provided by the PC output of said one camera.

22. The apparatus of claim 20 wherein said control means further includes means for sensing said time difference in the shutter-open pulses provided by the respective outputs, and means for indicating if this time difference exceeds a threshold amount.

23. The apparatus of claim 14 wherein said control means includes learning means selectively operable in a learning mode to measure said first and second shutter release delays and to determine the difference therebetween.

24. The apparatus of claim 23 wherein each of said cameras includes a PC output for providing a respective shutter-open pulse when the shutter therein is opened; and said learning means includes means for applying said start signal substantially concurrently to said film and video cameras as a shutter release signal; means for detecting shutter-open pulses provided by the PC outputs of the respective cameras; measuring means for measuring the delay between the start signal and the shutter-open pulse provided by the PC output of said film camera indicative of said first shutter release delay and for measuring the delay between the start signal and the shutter-open pulse provided by the PC output of said video camera indicative of said second shutter release delay; and means for storing the difference between the measured delays.

25. The apparatus of claim 24 wherein said control means comprises a programmable processor.

26. The apparatus of claim 14 wherein said record medium comprises a rotatable magnetic disk.

27. A method for synchronizing the imaging of a scene by two cameras, both of which include releasable shutters and at least one of which includes a storage medium for storing electronic image signals, said cameras exhibiting different shutter release delays $\tau_1$ and $\tau_2$ from the time that the shutter therein is released until the time that said shutter arrives at its fully opened position, said method comprising the steps of initiating the release of both shutters; timing both shutters to release at a time $t_a$ in response to said initiation when the storage medium in said one camera is conditioned to store electronic image signals; and delaying by an amount $\Delta T$ the release of the shutter of one camera relative to the release of the shutter of the other as a function of the difference in the respective shutter release delays of said cameras ($\Delta T = \tau_1 - \tau_2$) so that the shutters of both cameras arrive at their fully opened positions at substantially the same time t, where $t = t_a + \tau_1 = t_a + \Delta T + \tau_2$.

28. The method of claim 27 wherein the step of timing both shutters to release when the storage medium in said one camera is conditioned to store electronic image signals comprises generating a synchronizing pulse when said storage medium is so conditioned, and generating a trigger signal in response to said synchronizing pulse if the release of both shutters has been initiated.

29. The method of claim 28 wherein the step of delaying the release of the shutter of one camera relative to the release of the shutter of the other comprises releasing the shutter of the camera having the larger shutter release delay substantially immediately when said trigger signal is generated; and releasing the shutter of the other camera at a time delayed by said difference when said trigger signal is generated.

30. The method of claim 29 wherein said storage medium comprises a rotatable record disk and said synchronizing pulse is generated when said record disk rotates to a reference position.

31. The method of claim 29 further comprising the steps of detecting when each respective shutter is opened, and varying the delay with which the shutter of said other camera is released as a function of a difference in the time at which the respective shutters open.

32. A method for synchronizing the imaging of a scene by two cameras, both of which include releasable shutters and at least one of which includes a storage medium for storing electronic image signals, said cameras exhibiting different shutter release delays from the time that the shutter therein is released until the time that said shutter is opened, said method comprising the steps of initiating the release of both shutters; generating a synchronizing pulse when the storage medium in said one camera is conditioned to store electronic image signals; generating a trigger signal in response to said synchronizing pulse if the release of both shutters has been initiated; releasing the shutter of the camera having the larger shutter release delay substantially immediately when said trigger signal is generated; releasing the shutter of the other camera at a time delayed by the difference in the respective shutter release delays of the cameras when said trigger signal is generated; detecting when each respective shutter is opened; sensing a difference in the times at which both shutters open in response to the respective releases thereof, averaging the sensed differences over a predetermined number of releases, and selectively increasing or decreasing the delay with which the shutter of said other camera is released substantially by the average of the sensed differences.

33. A method for synchronizing the imaging of a scene by two cameras, both of which include releasable shutters and at least one of which includes a storage medium for storing electronic image signals, said cameras exhibiting different shutter release delays from the time that the shutter therein is released until the time that said shutter is opened, said method comprising the steps of initiating the release of both shutters; generating a synchronizing pulse when the storage medium in said one camera is conditioned to store electronic image signals; generating a trigger signal in response to said synchronizing pulse if the release of both shutters has been initiated; releasing the shutter of the camera having the larger shutter release delay substantially immediately when said trigger signal is generated; releasing the shutter of the other camera at a time delayed by the difference in the respective shutter release delays of the cameras when said trigger signal is generated; detecting when each respective shutter is opened; varying the delay with which the shutter of said other camera is released as a function of a difference in the time at which the respective shutters open; sensing if the shutter of one camera opens at a time that differs from the opening of the shutter of the other camera by more than a threshold amount, and providing an indication thereof.

34. A method for synchronizing the imaging of a scene by two cameras, both of which include releasable shutters and at least one of which includes a storage medium for storing electronic image signals, said cameras exhibiting different shutter release delays from the time that the shutter therein is released until the time that said shutter is opened, said method comprising the steps of initiating the release of both shutters; timing both shutters to release in response to said initiation when the storage medium in said one camera is conditioned to store electronic image signals; determining the difference between the respective shutter release delays of said cameras; and delaying the release of the shutter of one camera relative to the release of the shutter of the other as a function of said difference in the respective shutter release delays of said cameras.

35. The method of claim 34 wherein the step of determining the difference between the respective release delays of said cameras comprises measuring the respective shutter release delays of both cameras, obtaining a difference between the measured shutter release delays, identifying the camera exhibiting the smaller shutter release delay, and providing a delay substantially equal to said difference to the release of the shutter of the camera exhibiting the smaller shutter release delay.

36. The method of claim 35 wherein the step of measuring comprises releasing the shutters of both cameras concurrently when the release of both shutters has been initiated.

* * * * *